United States Patent
Xue et al.

(10) Patent No.: US 10,277,312 B2
(45) Date of Patent: Apr. 30, 2019

(54) METHOD FOR ADJUSTING LOS ALARM DECISION THRESHOLD AND OPTICAL MODULE

(71) Applicants: HISENSE BROADBAND MULTIMEDIA TECHNOLOGIES, LTD., Road Town (VG); HISENSE USA CORPORATION, Suwanee, GA (US); HISENSE INTERNATIONAL CO., LTD., Qingdao (CN)

(72) Inventors: Dengshan Xue, Qingdao (CN); Qisheng Zhao, Qingdao (CN)

(73) Assignees: HISENSE BROADBAND MULTIMEDIA TECHNOLOGIES CO., LTD., Shandong (CN); HISENSE BROADBAND MULTIMEDIA TECHNOLOGIES, LTD., Tortola (VG)

( * ) Notice: Subject to any disclaimer, the term of this patent is extended or adjusted under 35 U.S.C. 154(b) by 0 days.

(21) Appl. No.: 15/390,446

(22) Filed: Dec. 23, 2016

(65) Prior Publication Data
US 2018/0054255 A1    Feb. 22, 2018

(30) Foreign Application Priority Data
Aug. 22, 2016    (CN) .......................... 2016 1 0703676

(51) Int. Cl.
*H04B 10/079*    (2013.01)

(52) U.S. Cl.
CPC ..... *H04B 10/079* (2013.01); *H04B 10/07955* (2013.01)

(58) Field of Classification Search
None
See application file for complete search history.

(56) References Cited

U.S. PATENT DOCUMENTS

| | | | | |
|---|---|---|---|---|
| 6,941,077 B2* | 9/2005 | Aronson | ................ | G01M 11/00 398/135 |
| 7,250,806 B2* | 7/2007 | Zhang | ..................... | G05F 3/265 315/112 |
| 7,269,347 B1 | 9/2007 | Matricardi et al. | ............. | 398/24 |

(Continued)

FOREIGN PATENT DOCUMENTS

CN            101355389 A      1/2009

OTHER PUBLICATIONS

Medhi, Von Neumann Architecture, 2012 (www2.cs.siu.edu/~cs401/Textbook/ch2.pdf).*

(Continued)

*Primary Examiner* — Kenneth N Vanderpuye
*Assistant Examiner* — Jai M Lee
(74) *Attorney, Agent, or Firm* — J.C. Patents

(57) ABSTRACT

Embodiments of the present disclosure provide a method for adjusting a LOS alarm decision threshold and an optical module. The method includes: receiving an optical signal; determining a power value of the optical signal and an amplitude of an electrical signal converted from the optical signal; determining a first numeric relation between the power value and a preset threshold, and a second numeric relation between the amplitude value and a preset decision threshold; and adjusting the decision threshold according to the first numeric relation and the second numeric relation. The method for adjusting a LOS alarm decision threshold and the optical module provided in the embodiments of the present invention can improve the efficiency in setting the LOS alarm decision threshold.

6 Claims, 3 Drawing Sheets

(56) References Cited

U.S. PATENT DOCUMENTS

| | | | |
|---|---|---|---|
| 7,302,186 B2* | 11/2007 | Light | H04B 10/0799 398/135 |
| 8,059,959 B2* | 11/2011 | Kasezawa | H04B 10/0791 398/119 |
| 8,934,779 B2* | 1/2015 | Rope | H04B 17/101 398/136 |
| 2003/0095315 A1 | 5/2003 | Hoshide | 359/189 |
| 2004/0105687 A1 | 6/2004 | Myong et al. | 398/202 |
| 2004/0136421 A1 | 7/2004 | Robinson et al. | 372/38.02 |
| 2004/0136721 A1* | 7/2004 | Giaretta | H04B 10/40 398/135 |
| 2006/0067711 A1* | 3/2006 | Schulz | H03F 1/0205 398/202 |
| 2006/0147162 A1* | 7/2006 | Ekkizogloy | H04B 10/40 385/92 |
| 2006/0215545 A1* | 9/2006 | Nelson | H04B 10/0799 370/216 |
| 2006/0269283 A1* | 11/2006 | Iwadate | H04B 10/0799 398/22 |
| 2007/0280684 A1* | 12/2007 | Onoda | H04B 10/03 398/38 |
| 2008/0152358 A1* | 6/2008 | Uto | H04B 10/695 398/202 |
| 2009/0148168 A1* | 6/2009 | Li | H04B 10/032 398/130 |
| 2009/0304396 A1* | 12/2009 | Furukawa | H04B 10/0799 398/202 |
| 2011/0164874 A1* | 7/2011 | Zhang | H04B 10/695 398/38 |
| 2014/0332686 A1* | 11/2014 | Anzai | H04B 10/07957 250/338.4 |
| 2015/0229411 A1* | 8/2015 | Takeda | H04B 10/674 398/210 |

OTHER PUBLICATIONS

The extended European Search Report of corresponding European Application No. 16207014.8-1874, dated Jul. 14, 2017.

* cited by examiner

METHOD FOR ADJUSTING LOS ALARM DECISION THRESHOLD AND OPTICAL MODULE

CROSS-REFERENCE TO RELATED APPLICATION

This application claims the benefit of priority from Chinese Patent Application No. 201610703676.6, filed on Aug. 22, 2016, and entitled "Method for Adjusting LOS Alarm Decision Threshold and Optical Module", the entire contents of which are hereby incorporated by reference.

TECHNICAL FIELD

Embodiments of the present disclosure relate to the field of optical communication technology, and in particularly to a method for adjusting LOS alarm decision threshold and an optical module.

BACKGROUND

In an optical module, a RX_LOS signal (Loss Of Signal signal at receiver side) is an indication signal for indicating whether received optical power is lower than a preset threshold. In practical applications, a decision threshold of LOS alarm fixedly is fixedly set in a limiting amplifier of the optical module. Upon the optical module receiving an optical signal, the received optical signal will be processed by the trans-impedance amplifier (TIA), and the generated alternating current (AC) signal is inputted into the limiting amplifier. Then the limiting amplifier compares the amplitude of the AC signal with the preset LOS alarm decision threshold, and a comparison result is output to a processor as a RX_LOS signal, thus enabling the processor to determine whether to generate a LOS alarm based on the RX_LOS signal. Therefore, in the optical module, the setting of the LOS alarm decision threshold has a crucial effect on the decision of LOS alarm.

At present, the LOS alarm decision threshold is set as follows: after the arrangement of the photodetector APD, TIA and limiting amplifier, the LOS decision threshold is experimented by using several module samples and verified by using a small batch of modules. Then the LOS decision threshold will be adjusted according to the verification result and finally fixed.

However, due to different arrangements of APD, TIA, limiting amplifiers or different lengths of lines, the LOS alarm decision threshold of the limiting amplifier will be different, thereby causing a large amount of experimental data to be needed for determining the threshold level during use, so the use is inconvenient and of low efficiency.

SUMMARY

Embodiments of the present disclosure provides a method for adjusting a LOS alarm decision threshold and an optical module to improve the efficiency in setting the LOS alarm decision threshold.

In a first aspect, an embodiment of the present disclosure provides a method for adjusting a LOS alarm decision threshold, the method including:
receiving an optical signal;
determining a power value of the optical signal and an amplitude value of an electrical signal converted from the optical signal;
determining a first numeric relation between the power value and a preset threshold, and a second numeric relation between the amplitude value and a preset decision threshold; and
adjusting the decision threshold according to the first numeric relation and the second numeric relation.

In a second aspect, an embodiment of the present disclosure provides an optical module, the optical module including:
a receiving module, configured to receive an optical signal;
a first determining module, configured to determine a power value of the optical signal and an amplitude value of an electrical signal converted from the optical signal;
a second determining module, configured to determine a first numeric relation between the power value and a preset threshold and a second numeric relation between the amplitude value and a preset decision threshold; and
an adjusting module, configured to adjust the decision threshold according to the first numeric relation and the second numeric relation.

In a third aspect, an embodiment of the present disclosure provides an optical module, the optical module including: a memory configured to store instructions and a processor coupled with the memory and configured to execute instructions stored in the memory, and the processor is also configured to: receive an optical signal; determine a power value of the optical signal and an amplitude value of the electrical signal converted from the optical signal; determine a first numeric relation between the power value and a preset threshold and a second numeric relation between the amplitude value and a preset decision threshold; and adjust the decision threshold according to the first numeric relation and the second numeric relation.

In the embodiments of the present disclosure, when an optical signal is received, the power value of the optical signal and the amplitude value of the electrical signal converted from the optical signal are determined. The power value of the optical signal is compared with a preset threshold for determining a first numeric relation; and the amplitude value of the electrical signal is compared with the preset decision threshold for determining a second numeric relation, thus the LOS alarm decision threshold of the optical module can be automatically adjusted according to the first numeric relation and the second numeric relation. This allows the optical module to automatically adjust the LOS alarm decision threshold without requiring a large amount of experimental data to determine the LOS alarm decision threshold as that in the conventional technology, thus improving the efficiency in setting the LOS alarm decision threshold.

BRIEF DESCRIPTION OF THE DRAWINGS

In order to more clearly illustrate the technical solutions of the embodiments of the present application or the related art, the drawings which are used in the description of the embodiments or the related art will be briefly described below, and apparently, the described embodiments are just part rather than all of the embodiments of the present invention. Those with ordinary skill in the art can further obtain more drawings based on the embodiments of the present invention without creative efforts

DESCRIPTION OF EMBODIMENTS

The technical solutions in the embodiments of the present invention will be described clearly and completely as follows in conjunction with drawings accompanying the embodiments of the present invention. And apparently, the described embodiments are just part rather than all of the embodiments of the present invention. All the other embodiments acquired by one with ordinary skill in the art based on the embodiments of the present invention without creative efforts shall fall into the protection scope claimed by the present invention.

The terms "comprising", "having" and any variations in the specification and claims of the present disclosure are intended to cover non-exclusive inclusion, for example, a process comprising a series of steps or a device having certain structures is not necessarily limited to the explicitly listed steps or structures, but may include other steps or structures that are not explicitly listed or inherent to such processes or devices.

Figure 1:
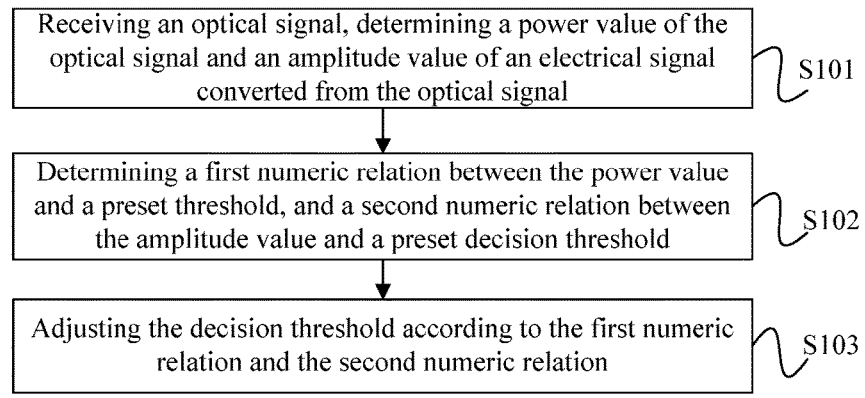
FIG. 1 is a flowchart of a method for adjusting a LOS alarm decision threshold according to some embodiments of the present disclosure.

FIG. 1 is a flowchart of a method for adjusting a LOS alarm decision threshold according to some embodiments of the present disclosure, and the method may be performed by an optical module. As shown in FIG. 1, the method provided by the embodiment includes the steps of:

Step S101: receiving an optical signal, determining a power value of the optical signal and an amplitude value of an electrical signal converted from the optical signal.

Figure 2:
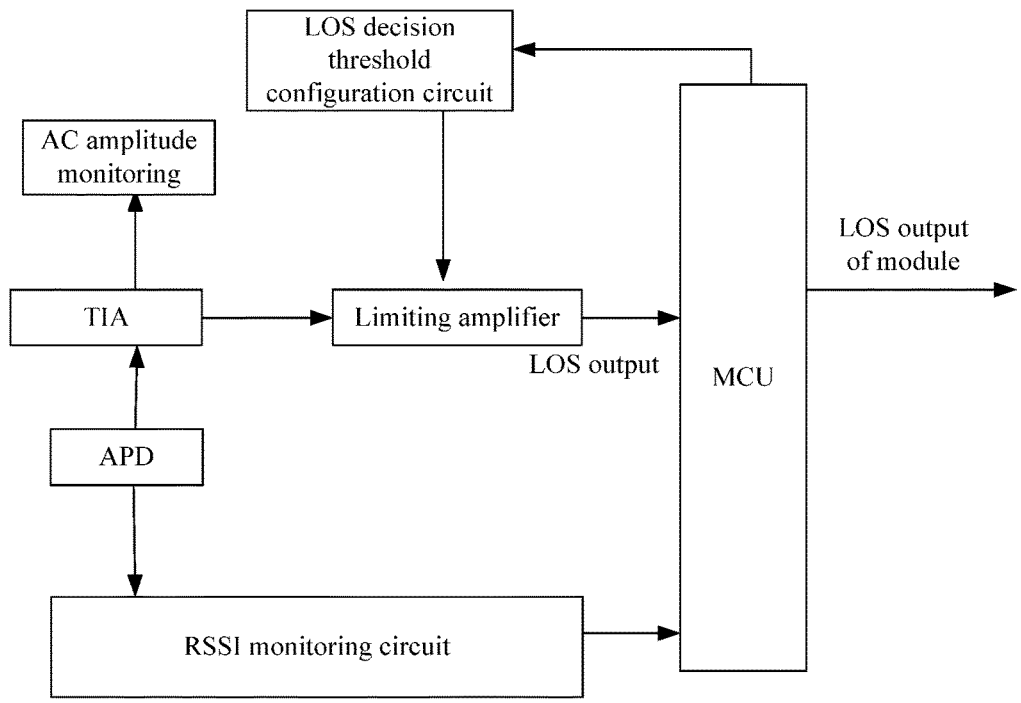
FIG. 2 is a schematic view of a LOS alarm output control circuit according to some embodiments of the present disclosure.

FIG. 2 is a schematic view of a LOS alarm output control circuit according to some embodiments of the present disclosure. As shown in FIG. 2, after an optical signal is detected by the photodetector APD, a received signal strength indicator (RSSI) monitoring circuit obtains a power value of the optical signal from the photodetector APD.

In addition, after the optical signal is detected by the APD, the optical signal will go through a trans-impedance amplifier TIA and be transformed into an AC signal with certain signal amplitude. Specifically, in the embodiment of the present disclosure, the amplitude of the AC signal outputted by the TIA is monitored by a built-in AC amplitude monitoring circuit to obtain the amplitude value of the electrical signal corresponding to the optical signal.

Step S102: determining a first numeric relation between the power value and a preset threshold, and a second numeric relation between the amplitude value and a preset decision threshold. In actual application, after obtaining the power value of the input optical signal, the optical module determines the first numeric relation between the power value and the preset threshold by comparing the power value with a preset threshold, where the first numeric relation represents a size relation between the power value and the preset threshold. When the first numeric relation is determined, if the first numeric relation indicates that the power value of the optical signal is less than the preset threshold, then the power of the input optical signal is too small, and the optical module should generate a LOS alarm when the optical modules operates normally. If the first numeric relation indicates that the power value of the optical signal is greater than the preset threshold, then the power of the input optical signal meets the sensitivity requirement of the optical module, and the optical module does not generate a LOS alarm in normal situation. It should to be understood that the preset threshold may be a predetermined optimum threshold that can be used to determine whether to generate a LOS alarm according to the power value of the optical signal. The present disclosure does not limit the way in which the preset threshold is determined.

In addition, after obtaining the amplitude value of the electrical signal, the AC amplitude monitoring circuit determines the second numeric relation between the amplitude value and the decision threshold by comparing the monitored amplitude value with the preset decision threshold in the limiting amplifier, where the second numeric relation represents the size relation between the amplitude value and the decision threshold. When the amplitude value of the electrical signal is less than the decision threshold, the optical module generates a LOS alarm signal, and when the amplitude value of the electrical signal is greater than the decision threshold, the optical module does not generate a LOS alarm signal.

Step S103: adjusting the decision threshold according to the first numeric relation and the second numeric relation.

In the embodiment of the present disclosure, after receiving the optical signal, the optical module judges and reports the LOS alarm by using a built-in limiting amplifier, and monitors the power of the received optical signal by using a RSSI monitoring circuit, and realizes the correction of the decision threshold in the limiting amplifier by matching the monitored result with the LOS alarm information output by the limiting amplifier, as described in detail below.

In actual situation, if the LOS alarm decision threshold of the optical module is set improperly, a problem of false or missing LOS alarm will be caused. In one example, the power of the optical signal is less than a preset threshold, while the limiting amplifier determines that the amplitude value of the electrical signal corresponding to the optical signal is greater than a preset decision threshold. Normally, the amplitude value of the electrical signal should be less than the decision threshold at this time and the corresponding optical module should generate a LOS alarm. However, in the actual situation, the optical module does not generate a LOS alarm. The reason for this is that the preset decision threshold is too small. Therefore, the decision threshold should be increased, so that the amplitude value of the electrical signal corresponding to the optical signal is less than the decision threshold when the received optical signal is less than the preset threshold.

In another example, the power of the optical signal is greater than a preset threshold, while the limiting amplifier determines that the amplitude value of the electrical signal corresponding to the optical signal is less than a preset decision threshold. Normally, the amplitude value of the electrical signal should be greater than the threshold and accordingly, the optical module should not generate a LOS alarm. However, in the actual situation, the optical module generates a LOS alarm. The reason for this is that the preset decision threshold is too large. Therefore, the decision threshold should be decreased, so that the amplitude value of the electrical signal corresponding to the optical signal is greater than the decision threshold when the received optical signal is greater than the preset threshold.

In the embodiments of the present disclosure, after an optical signal is received, the power value of the optical signal and the amplitude value of the electrical signal converted from the optical signal are determined. The power value of the optical signal is compared with a preset threshold to determine a first numeric relation; and the amplitude value of the electrical signal is compared with the preset decision threshold to determine a second numeric relation, thereby automatically adjusting the LOS alarm decision threshold of the optical module according to the first numeric relation and the second numeric relation. In the embodiment of the present disclosure, the power value of the optical signal is used to adjust the LOS alarm decision threshold corresponding to the electrical signal. This allows the optical module to automatically adjust the LOS alarm decision threshold without requiring a large amount of experimental data to determine the LOS alarm decision threshold as that in the conventional technology, thus improving the efficiency in setting the LOS alarm decision threshold.

Figure 3:
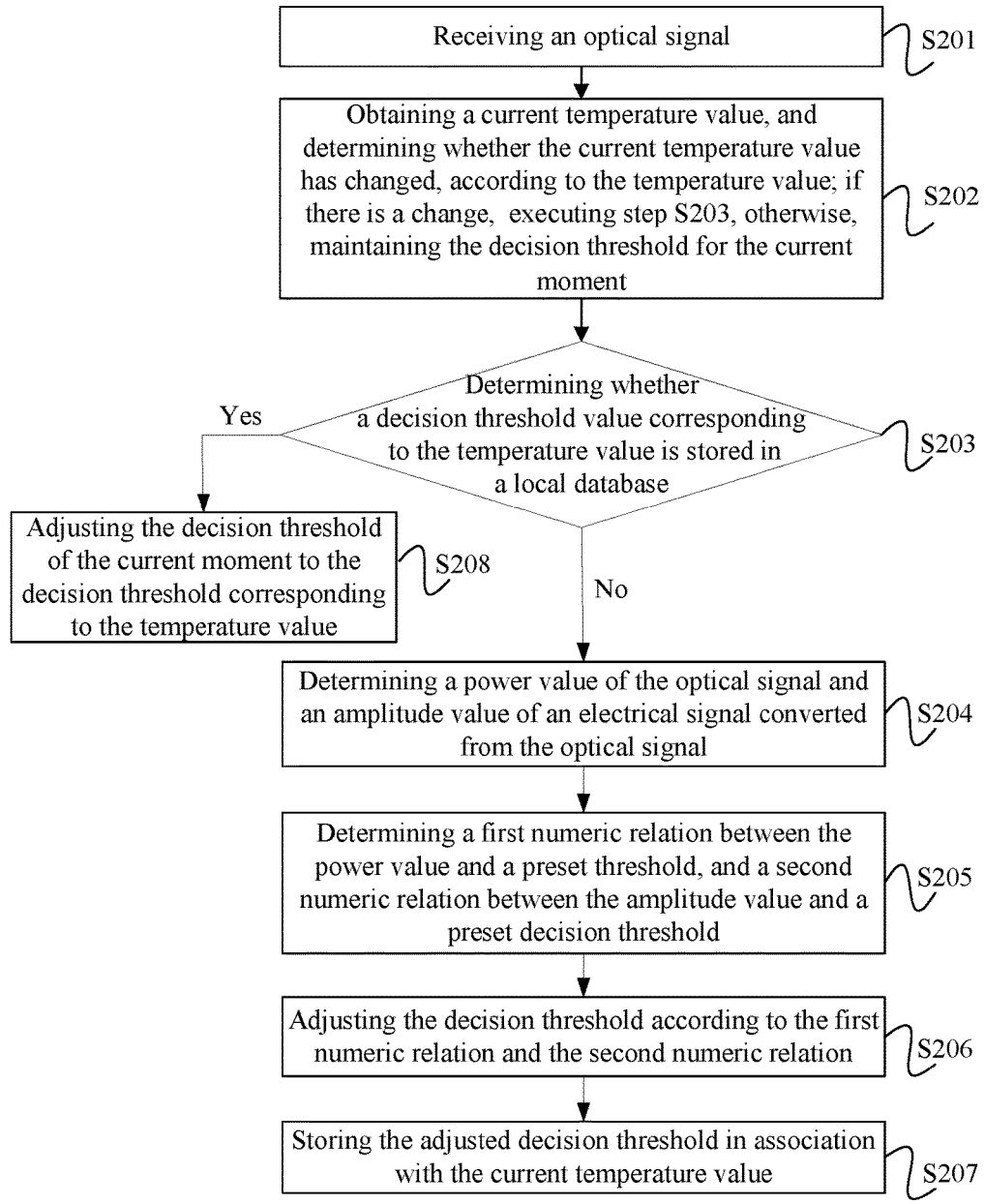
FIG. 3 is a flowchart of a method for adjusting a LOS alarm decision threshold according to some other embodiments of the present disclosure.

FIG. 3 is a flowchart of a method for adjusting a LOS alarm decision threshold according to some other embodiments of the present disclosure. On the basis of the method of FIG. 1, the method as shown in FIG. 3 includes the steps of:

Step S201: receiving an optical signal.

Step S202: Obtaining a current temperature value, and determining whether the current temperature value has changed, according to the temperature value; if there is a change, executing step S203, otherwise, maintaining the decision threshold for the current moment.

In actual application, after receiving the optical signal, optionally, the current temperature value of environment is obtained by the temperature sensor and compared with the temperature value of a previous moment, to determine whether the current temperature has changed. If there is a change, an operation of adjusting the LOS alarm decision threshold is performed, otherwise, the decision threshold for the current moment will be maintained.

Step S203: determining whether a decision threshold value corresponding to the temperature value is stored in a local database, and if it is not stored, step S204 will be executed; otherwise, step S208 will be executed.

In actual application, the decision threshold of the optical module can be adapted to the change of outside temperature, and thus the accuracy of the decision threshold can be guaranteed all the time so as to prevent false alarm or missing alarm. In the embodiment of the disclosure, some optimum decision thresholds of the optical modules corresponding to certain temperature values are stored in the local database of the optical module. When the optical module determines that the current outside temperature changes, the optical module first determines whether a decision threshold corresponding to the temperature value of the current moment is stored in the local database. If it is stored, the current decision threshold will be adjusted to the decision threshold corresponding to the temperature value of the current moment, and if it is not stored, steps S204 to S206 will be executed to determine the decision threshold corresponding to the current temperature.

Step S204: determining a power value of the optical signal and an amplitude value of an electrical signal converted from the optical signal.

Step S205: determining a first numeric relation between the power value and a preset threshold, and a second numeric relation between the amplitude value and a preset decision threshold.

Step S206: adjusting the decision threshold according to the first numeric relation and the second numeric relation.

Step S207: storing the adjusted decision threshold in association with the current temperature value.

In the actual operation, after determining the decision threshold for the current temperature, the current temperature is stored in association with the decision threshold so that the decision threshold can be directly used in the next adjustment operation of the decision threshold, thereby avoiding repeated determination operations and improving the efficiency in adjusting the decision threshold.

Step S208: adjusting the decision threshold of the current moment to the decision threshold corresponding to the temperature value.

In the embodiment of the present disclosure, the change of the current temperature is taken as a triggering condition for the adjustment operation of the decision threshold, and the optimum decision thresholds for some temperature values are stored in the local database in advance so that the decision threshold of the optical module can perform self-adjusting with the outside temperature value, avoiding the impact of outside temperature on the decision threshold.

Figure 4:
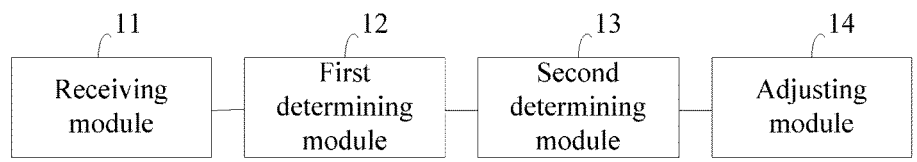
FIG. 4 is a structural view of an optical module according to some embodiments of the present disclosure.

FIG. 4 is a structural view of an optical module according to some embodiments of the present disclosure. As shown in FIG. 4, the optical module of the embodiment of the present disclosure includes:

a receiving module 11, configured to receive an optical signal;

a first determining module 12, configured to determine a power value of the optical signal and an amplitude value of an electrical signal converted from the optical signal;

a second determining module 13, configured to determine a first numeric relation between the power value and a preset threshold as well as a second numeric relation between the amplitude value and a preset decision threshold; and an adjusting module 14 configured to adjust the decision threshold according to the first numeric relation and the second numeric relation.

When the first numeric relation indicates that the power value is less than the preset threshold and the second numeric relation indicates that the amplitude value is greater than the preset decision threshold, the adjusting module 14 is configured to increase the decision threshold such that the amplitude value is less than the decision threshold when the power value is less than the preset threshold.

When the first numeric relation indicates that the power value is greater than the preset threshold and the second numeric relation indicates that the amplitude value is less than the preset decision threshold, the adjusting module 14 is configured to decrease the decision threshold such that the amplitude value is greater than the decision threshold when the power value is greater than the preset threshold.

The optical module provided by the embodiment of the present disclosure can be used to carry out the method of the embodiment shown in FIG. 1, which has similar implementation and beneficial effects and will not be repeated herein.

Figure 5:
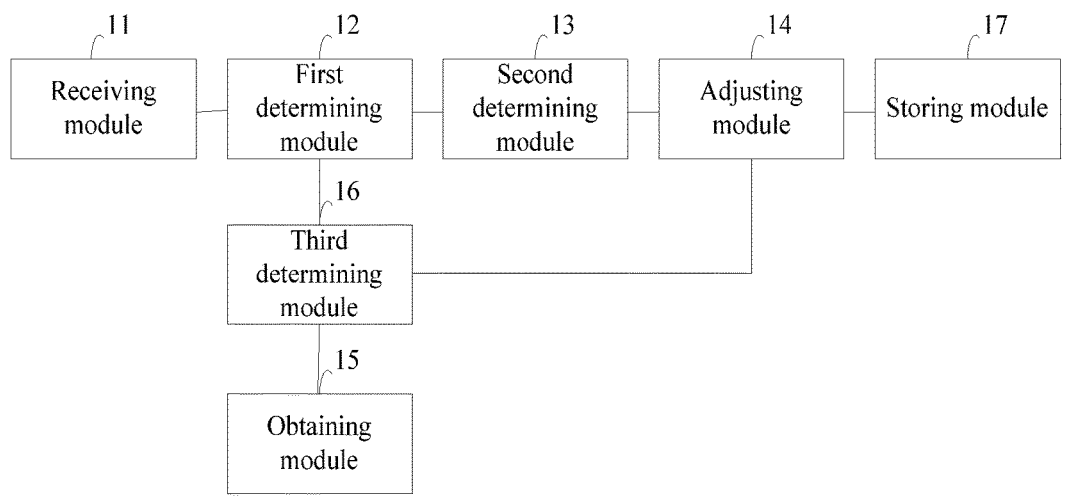
FIG. 5 is a schematic view of an optical module according to some other embodiments of the present disclosure.

FIG. 5 is a schematic view of an optical module according to some other embodiments of the present disclosure. On the basis of the structure of FIG. 4, as shown in FIG. 5, the optical module further includes:

an obtaining module, configured to obtain a temperature value of current moment;

a third determining module 16, configured to determine whether current temperature has changed according to the temperature value; if there is a change, determine whether a decision threshold corresponding to the temperature value of the current moment has been stored in a local database;

if the decision threshold is not stored, the first determination module 12 determines the power value of the optical signal and the amplitude value of the electrical signal converted from the optical signal;

the adjusting module 14, further configured to adjust the decision threshold of the current moment to the decision threshold corresponding to the temperature value which is stored in the local database.

a storing module 17, configured to store the adjusted decision threshold in association with the current temperature value.

The optical module provided by the embodiments of the present disclosure can be used to carry out the method of the embodiment shown in FIG. 3, which has similar implementation and beneficial effects and will not be repeated herein.

The embodiments of the present disclosure further provides an optical module, the optical module including: a memory for storing instructions and a processor coupled with the memory and configured to execute the instructions stored in the memory, and the processor is also configured to: receive an optical signal; determine a power value of the optical signal and an amplitude value of an electrical signal converted from the optical signal; determine a first numeric relation between the power value and a preset threshold and a second numeric relation between the amplitude value and a preset decision threshold; and adjust the decision threshold based on the first numeric relation and the second numeric relation.

The optical module provided by the embodiments of the present disclosure can be used to carry out the method of any above-mentioned embodiments, which has similar the implementation and beneficial effects and will not be repeated herein.

Finally, it should be noted that, the above embodiments are merely intended to illustrate rather than limit the technical solutions of the present invention; and although the present invention has been concretely described in reference to the above embodiments, one with ordinary skill in the art shall understand that modifications can still be made to the technical solutions recorded in the foregoing embodiments, or that equivalent substitutions can still be made to part or all of the technical features therein; neither these modifications nor these substitutions shall make the essence of the corresponding technical solutions depart from the scope of the technical solutions in the above embodiments of the present invention.

What is claimed is:

1. A method for adjusting a loss of signal (LOS) alarm decision threshold, comprising:

receiving an optical signal;

determining a power value of the optical signal and an amplitude value of an electrical signal converted from the optical signal;

determining a first numeric relation between the power value and a preset threshold, and a second numeric relation between the amplitude value and the LOS alarm decision threshold; and adjusting the LOS alarm decision threshold according to the first numeric relation and the second numeric relation;

wherein, when the first numeric relation indicates that the power value is less than the preset threshold and the second numeric relation indicates that the amplitude value is greater than the LOS alarm decision threshold, the adjusting the LOS alarm decision threshold according to the first numeric relation and the second numeric relation, comprising:

increasing the LOS alarm decision threshold, so that the amplitude value is less than the LOS alarm decision threshold when the power value is less than the preset threshold, when the first numeric relation indicates that the power value is greater than the preset threshold and the second numeric relation indicates that the amplitude value is less than the LOS alarm decision threshold, the adjusting the LOS alarm decision threshold according to the first numeric relation and the second numeric relation, comprising:

decreasing the LOS alarm decision threshold, so that the amplitude value is greater than the LOS alarm decision threshold when the power value is greater than the preset threshold.

2. The method according to claim 1, before the determining the power value of the optical signal and the amplitude value of the electrical signal converted from the optical signal, the method further comprising:

obtaining a temperature value of current moment;

determining whether a current temperature has changed according to the temperature value;

if there is a change, determining whether a LOS alarm decision threshold corresponding to the temperature value is stored in a local database;

wherein, if the LOS alarm decision threshold corresponding to the temperature value is stored, performing the step of determining the power value of the optical signal and the amplitude value of the electrical signal converted from the optical signal;

if the LOS alarm decision threshold corresponding to the temperature value is not stored, adjusting the LOS alarm decision threshold of the current moment to the LOS alarm decision threshold corresponding to the temperature value.

3. The method according to claim 2, after adjusting the LOS alarm decision threshold according to the first numeric relation and the second numeric relation, the method further comprising:

storing the adjusted LOS alarm decision threshold in association with the temperature value at the current moment.

4. An optical module, comprising: a memory for storing instructions; a processor coupled to the memory, configured to execute the instructions stored in the memory, and the processor is configured to:

determine a power value of an optical signal received by the optical module and an amplitude value of an electrical signal converted from the optical signal;

determine a first numeric relation between the power value and a preset threshold, and a second numeric relation between the amplitude value and a LOS alarm decision threshold; and adjust the LOS alarm decision threshold according to the first numeric relation and the second numeric relation;

wherein, when the first numeric relation indicates that the power value is less than the preset threshold and the second numeric relation indicates that the amplitude value is greater than the LOS alarm decision threshold, the processor is configured to increase the LOS alarm decision threshold, so that the amplitude value is less than the LOS alarm decision threshold when the power value is less than the preset threshold, when the first numeric relation indicates that the power value is greater than the preset threshold and the second numeric relation indicates that the amplitude value is less than the LOS alarm decision threshold, the processor is configured to decrease the LOS alarm decision threshold, so that the amplitude value is greater than the LOS alarm decision threshold when the power value is greater than the preset threshold.

5. The optical module according to claim 4, wherein the processor is further configured to:
   obtain a temperature value of current moment;
   determine whether a current temperature has changed according to the temperature value; if there is a change, determine whether a LOS alarm decision threshold corresponding to the temperature value is stored in the local database;
   wherein, if the LOS alarm decision threshold corresponding to the temperature value is not stored, determine the power value of the optical signal and the amplitude value of the electrical signal converted from the optical signal;
   when the LOS alarm decision threshold corresponding to the temperature value is stored in the local database, adjust the LOS alarm decision threshold of the current moment to the LOS alarm decision threshold corresponding to the temperature value.

6. The optical module of claim 5, wherein the processor is further configured to:
   store the adjusted LOS alarm decision threshold in association with the temperature value of current moment.

* * * * *